(12) United States Patent
Evans et al.

(10) Patent No.: US 6,519,069 B1
(45) Date of Patent: Feb. 11, 2003

(54) OPTOELECTRIC CONVERTER

(75) Inventors: Jeffrey S. Evans, Grass Valley, CA (US); Charles S. Meyer, Neveda City, CA (US)

(73) Assignee: NVision, Inc., Grass Valley, CA (US)

( * ) Notice: Subject to any disclaimer, the term of this patent is extended or adjusted under 35 U.S.C. 154(b) by 0 days.

(21) Appl. No.: 09/261,009

(22) Filed: Mar. 2, 1999

(51) Int. Cl.[7] .................................................. H04B 10/06
(52) U.S. Cl. ......................................... 359/189; 359/194
(58) Field of Search ............................... 359/109–195, 359/189, 194

(56) References Cited

U.S. PATENT DOCUMENTS 5,025,456 A * 6/1991 Ota et al. ........................ 327/72
5,132,828 A * 7/1992 Conner et al. ............... 348/682
5,652,767 A * 7/1997 Kiyonaga et al. ........... 327/144
6,330,375 B1 * 12/2001 Fishman et al. ............. 359/122

* cited by examiner

*Primary Examiner*—Leslie Pascal
(74) *Attorney, Agent, or Firm*—John Smith-Hall; Smith-Hall and Bedell

(57) ABSTRACT

An optoelectric converter for generating a binary electrical data signal from a binary optical data signal includes a semiconductor photodetector for receiving the optical data signal and generating an electrical current signal. An amplifier receives the current signal generated by the semiconductor photodetector and providing a voltage output signal. An equalizer receives the voltage signal generated by the amplifier and generates an equalizer output voltage signal. A DC restorer receives the equalizer output voltage signal and generates a DC restored voltage signal.

5 Claims, 2 Drawing Sheets

OPTOELECTRIC CONVERTER

BACKGROUND OF THE INVENTION

This invention relates to an optoelectric converter.

In optical serial transmission of digital data, baseband binary data is used to modulate an electrical data signal which controls the state of a laser diode at the transmitting end of a fiber optic cable. An optoelectric converter at the receiving end of the fiber optic cable is used to convert the optical signal back to electrical form so that the binary data can be recovered.

Referring to FIG. 1, a conventional optoelectric converter includes a photodiode D10, which generates a very small current signal proportional to the received optical power, a transimpedance amplifier 12 for converting the current signal to a voltage signal, and a gain stage 13 having a fixed gain. The transimpedance amplifier and the gain stage are typically AC coupled. A comparator 14 compares the voltage signal provided by the gain stage 13 with a slice level $V_{slice}$ for recovering the baseband data. The gain of the gain stage 13 is selected so that the voltage signal provided by the gain stage will be compatible with the comparator 14. Specifically, for accurate recovery of the data, it is necessary that the voltage range of the output signal of the gain stage 13 should bracket the slice level $V_{slice}$.

The laser diode at the transmitting end of the fiber optic cable is operated at two distinct non-zero current levels of the same polarity depending on the logic state of the baseband data. Correspondingly, the signal generated by the photodiode D10 has two distinct non-zero current levels of the same polarity. The transimpedance amplifier converts the two distinct non-zero current levels of the same polarity to two distinct non-zero voltage levels of the same polarity.

If the strings of consecutive 1's and 0's in the baseband data are very short and the time constants of the AC coupling capacitor and associated impedances are sufficiently long, the DC level of the voltage signal generated by the transimpedance amplifier and gain stage is preserved. Accordingly, the DC level of the output voltage signal of the transimpedance amplifier is non-zero and is typically such that the two voltage levels corresponding to the two non-zero current levels of the input current signal are both positive. The data recovery slice level is set approximately midway between the two positive voltage levels and the baseband data is recovered with a high degree of accuracy. If, however, the baseband data includes a long sequence of 1's or 0's, the coupling capacitor charges and the average signal level rises or falls, depending on whether the sequence is of 1's or 0's, and the range of the output signal may no longer bracket the data recovery slice level and the data cannot be recovered accurately.

The digital source data that is to be transmitted over a fiber optic cable may be composed of multi-bit words which are coded as a serial binary data stream for serial propagation. For efficient data propagation, it is desirable that the baseband data have zero DC content.

The SMPTE 259 standard for serial digital interface (SDI) signals and the SMPTE 292 standard for high definition serial digital interface (HDSDI) signals each prescribe a scheme for mapping 10-bit video data words to a serial binary data stream. The serial data stream has a data rate up to 1.5 Gb/s. SMPTE 259 and SMPTE 292 each prescribe a polynomial, or PN, scrambler, which functions well to generate baseband data having minimal DC content provided that the video data supplied to the scrambler is random, or nearly so. When the source of the video data is a camera, noise generated in the camera provides a sufficient degree of randomness. However, the content of some computer generated video data is not sufficiently random, and the PN scrambler can generate baseband data having very long strings of consecutive 1's and 0's in response to these so-called pathological signals.

In the case of a pathological signal, the period of the low frequency content of the voltage signal generated by the first stage of the transimpedance amplifier may exceed the time constants associated with the AC coupling capacitor. As a result, the DC level of the voltage signal generated by the transimpedance amplifier drifts up or down so that the voltage range of the signal no longer brackets the data recovery slice level. It is therefore necessary to restore the DC level of the data signal in order to achieve accurate data recovery.

It would be possible in principle to build a DC restorer using discrete components, but there are significant practical difficulties in using discrete components to build a DC restorer that is able to function with signals having data rates as high as 1.5 Gb/s. These practical difficulties could be avoided or reduced by use of a monolithic integrated circuit, but a DC restorer in the form of a monolithic integrated circuit is not available commercially as a separate product.

A cable equalizer is used to compensate for frequency-dependent attenuation of an electrical signal being propagated over a conductive cable. The conventional cable equalizer detects the amplitude of the signal at a selected time and compares this amplitude with a reference value, and uses the result of this comparison to control a frequency-dependent emphasizer or amplifier, so as to eliminate the difference between the measured value and the reference value.

Cable equalizers suitable for equalizing serial binary data signals having data rates up to 1.5 Gb/s are commercially available in the form of monolithic integrated circuits. For example, the type GS 9024 monolithic integrated circuit is suitable for equalizing SDI signals and the type GS 1504 monolithic integrated circuit is suitable for equalizing HDSDI signals. Each of these cable equalizers has an output stage which provides a DC restore function to ensure that the range of the output signal brackets the standard data recovery slice level; each also has a cable-length indicator output, which provides a signal indicating the length of cable through which the signal has passed.

It would not normally be necessary or desirable to equalize the signal generated by the transimpedance amplifier shown in FIG. 1, because the data signal has not been propagated over an electrically conductive cable, and equalization would tend to overequalize the data signal, distorting its zero crossings and wave shape.

SUMMARY OF THE INVENTION

According to the present invention there is provided an optoelectric converter for generating a binary electrical data signal from a binary optical data signal, comprising a semiconductor photodetector for receiving the optical data signal and generating an electrical current signal, an amplifier means receiving the current signal generated by the semiconductor photodetector and providing a voltage signal at an output of the amplifier means, an equalizer means which receives the voltage signal generated by the amplifier means and generates an equalizer output voltage signal, and a DC restore means which receives the equalizer output voltage signal and generates a DC restored voltage signal.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate components having like or similar functions.

DETAILED DESCRIPTION

Figure 1:
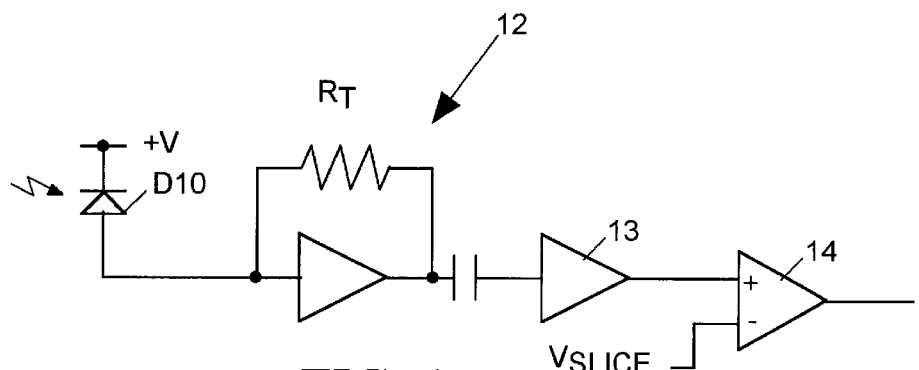
FIG. 1 is a block diagram of an optoelectric converter in accordance with the prior art.
Figure 2:
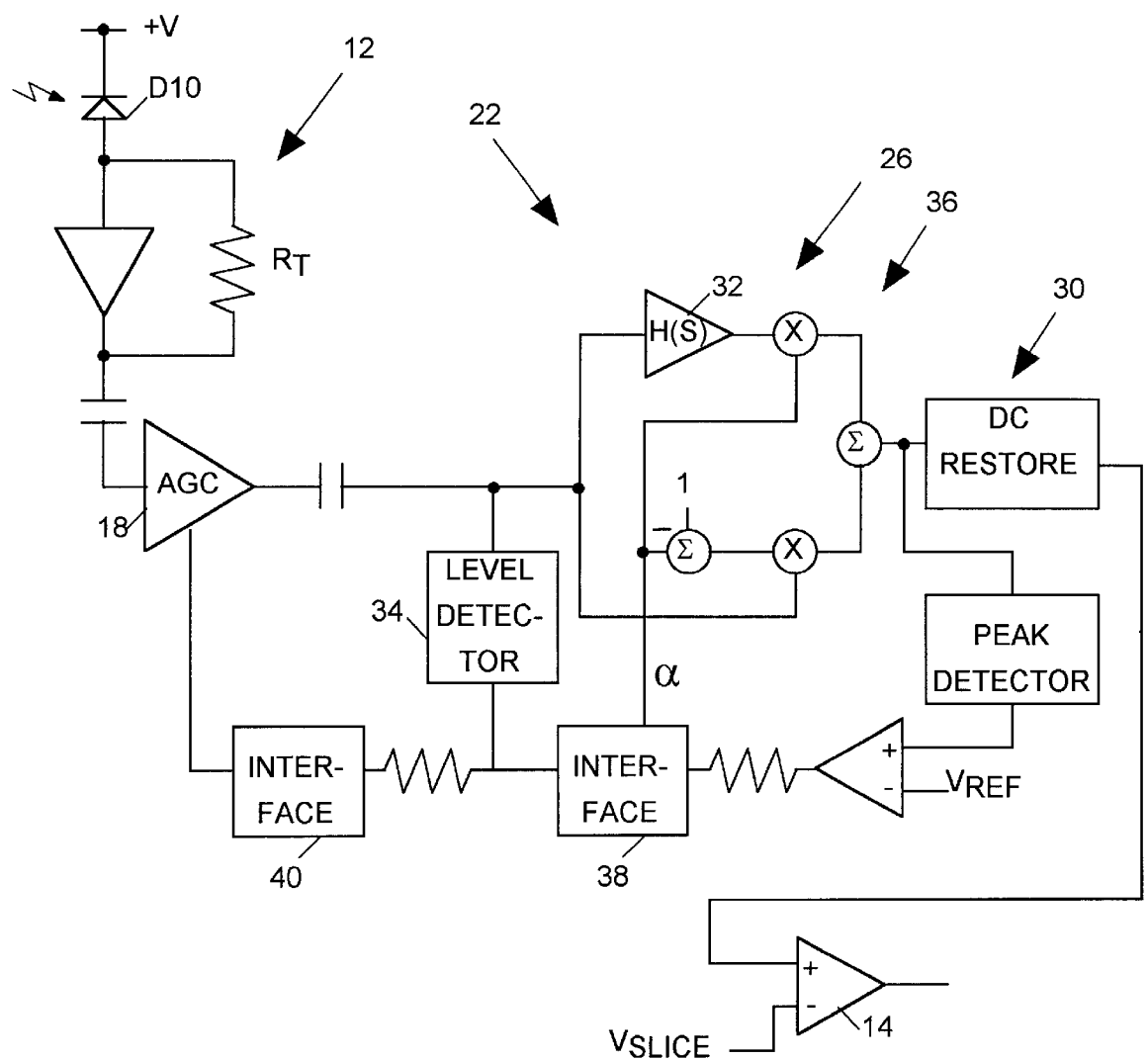
FIG. 2 is a block diagram of an optoelectric converter in accordance with the present invention.

FIG. 2 illustrates the main functional components of a able equalizer 22 that could be implemented as a monolithic integrated circuit. The cable equalizer 22 includes an equalizing section 26 and a DC restore section 30. The equalizer 22 also includes a level detector 34 which generates a cable length indicator signal CLI based on the level of the input signal received by the cable equalizer. If the input signal of the cable equalizer had been transmitted to the cable equalizer over a length of electrically conductive cable, the level of the cable length indicator signal CLI would indicate the length of cable through which the signal had passed before reaching the cable equalizer. The cable length indicator signal CLI is available at a pin of the integrated circuit.

As is conventional, the equalizing section 26 includes an amplifier 32 and a mixer 36. The amplifier 32 is connected to the input of the cable equalizer 22. The mixer receives both the input signal of the equalizer and the output signal of the amplifier 32 and provides an output signal $V_{out}$ which is a weighted sum of these signals.

The amplifier 32 has a transfer function H(S) which is the mathematical inverse of the transfer function of a fixed length of cable material. Accordingly, the amplifier 32 behaves as a high frequency emphasis circuit which compensates for the loss of a fixed length of cable. The mix coefficient α is derived by an interface circuit 38 as a function of both the level of the cable length indicator signal CLI and the difference between the peak amplitude of the output signal of the equalizer section 26 during a selected interval and a reference voltage $V_{ref}$, detected by a peak detector.

In accordance with the invention, the output of the transimpedance amplifier 12 is AC coupled to a voltage controlled amplifier 18 whose output is AC coupled to the input of the cable equalizer 22 and the cable length indicator output of the cable equalizer is connected through an interface circuit 40 to the control voltage input of the VCA 18. The interface circuit 40, which may include gain and/or offset functions, matches the output range of the cable length indicator signal CLI to the input range of the control voltage input of the VCA 18 so that the level of the cable length indicator signal CLI is forced to zero. In response to the level of the cable length indicator signal CLI being forced to zero, the interface circuit 38 forces the value of the mix coefficient a to zero. Consequently, the equalizing function of the equalizer 22 is suppressed.

In the event that the optical data signal received by the photodiode D10 has only short runs of 1's and 0's, the output signal of the equalizing section 26 has the proper range and the DC restore section 30 has no significant effect on the level of the signal. On the other hand, if the optical signal is derived from a pathological SDI or HDSDI signal, and therefore has long runs of consecutive 1's or 0's, the output signal of the equalizing section has a reduced or increased DC level and the DC restore section 30 functions to shift the DC level up or down so that the range of the output signal of the DC restore section 30 spans the slice level $V_{slice}$.

Figure 3:
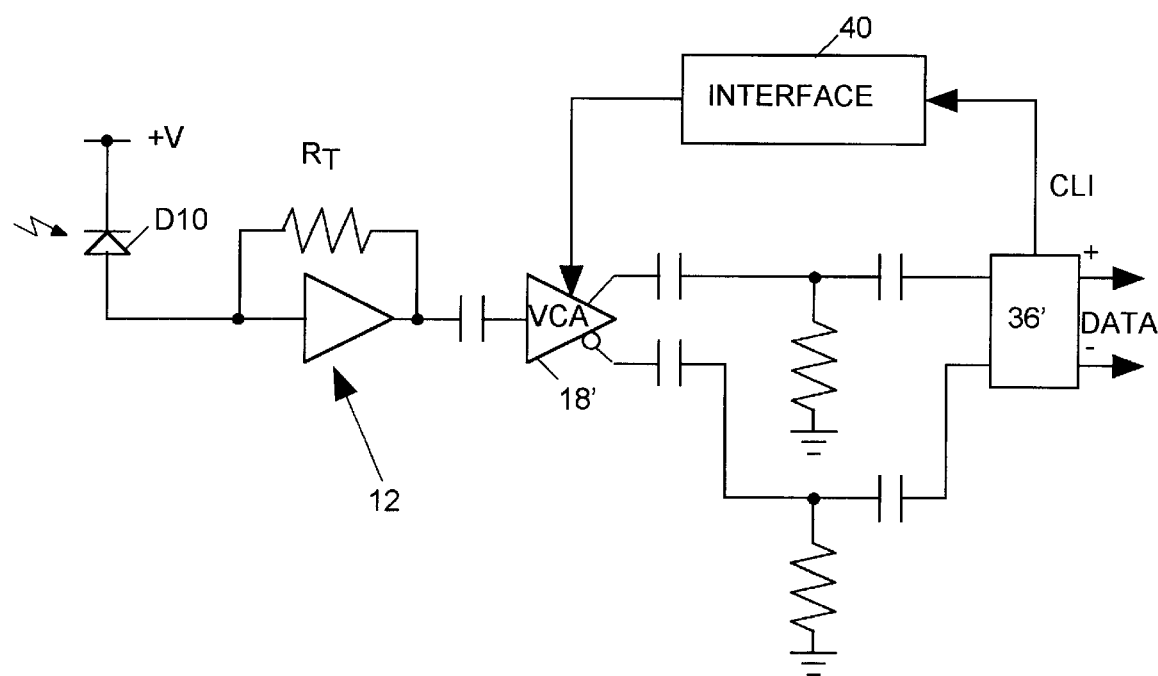
FIG. 3 is a block diagram of a second optoelectric converter in accordance with the present invention.

The voltage controlled amplifier 18' of the optoelectric converter illustrated in FIG. 3 provides a balanced output and the inverted and non-inverted output terminals are AC coupled to respective pins of a monolithic integrated circuit 36' which incorporates a cable equalizer and a DC restorer. The integrated circuit 36' may be type GS 1504 or type GS 9024, for example. The integrated circuit 36' has inverting and non-inverting output terminals which are connected to respective pins of a data recovery circuit (not shown), which may be of conventional form.

The integrated circuit 36' has a cable length indicator output which is connected through the interface circuit 40 to the control voltage input of the voltage controlled amplifier 18'.

It will be appreciated that the invention is not restricted to the particular embodiment that has been described, and that variations may be made therein without departing from the scope of the invention as defined in the appended claims and equivalents thereof.

What is claimed is:

1. An optoelectric converter for generating a binary electrical data signal from a binary optical data signal, comprising:

a semiconductor photodetector for receiving the optical data signal and generating an electrical current signal, an amplifier means receiving the current signal generated by the semiconductor photodetector and providing a voltage signal at an output of the amplifier means, an equalizer means which receives the voltage signal generated by the amplifier means and generates an equalizer output voltage signal, a DC restore means which receives the equalizer output voltage signal and generates a DC restored voltage signal, and a means for suppressing the equalizing means to avoid distortion of the data signal.

2. An optoelectric converter according to claim 1, wherein the amplifier means includes a transimpedance amplifier and a voltage gain stage which is AC coupled to the transimpedance amplifier.

3. An optoelectric converter according to claim 1, wherein the equalizer means and the DC restore means are implemented by a monolithic integrated circuit.

4. An optoelectric converter for generating a binary electrical data signal from a binary optical data signal, comprising:

a semiconductor photodetector for receiving the optical data signal and generating an electrical current signal, an amplifier means receiving the current signal generated by the semiconductor photodetector and providing a voltage signal at an output of the amplifier means, the amplifier means comprising a transimpedance amplifier and a voltage gain stage which is AC coupled to the transimpedance amplifier, the voltage gain stage of the amplifier means comprising a variable gain amplifier having a control input, an equalizer means which receives the voltage signal generated by the amplifier means and generates an equalizer output voltage signal, the equalizer means generating a cable length indicator signal depending on the amplitude of the voltage signal provided by the amplifier means, an interface means for supplying the cable length indicator signal to the control input of the variable gain amplifier, so that the amplitude of the voltage signal generated by the amplifier means is equal to a reference value, and a DC restore means which receives the equalizer output voltage signal and generates a DC restored voltage signal.

5. An optoelectric converter for generating a binary electrical data signal from a binary optical data signal, comprising:

a semiconductor photodetector for receiving the optical data signal and generating an electrical current signal, an amplifier means receiving the current signal generated by the semiconductor photodetector and providing a voltage signal at an output of the amplifier means, the amplifier means comprising a voltage controlled amplifier having a control voltage input, an equalizer means which receives the voltage signal generated by the amplifier means and generates an equalizer output voltage signal, the equalizer means generating a cable length indicator signal depending on the amplitude of the voltage signal provided by the amplifier means, an interface means for supplying the cable length indicator signal to the control voltage input of the voltage controlled amplifier, so that the peak amplitude of the voltage signal generated by the amplifier means is equal to a reference value, and a DC restore means which receives the equalizer output voltage signal and generates a DC restored voltage signal.

* * * * *